No. 845,194. PATENTED FEB. 26, 1907.
H. POCOCK.
MACHINE FOR MAKING CEMENT BRICK.
APPLICATION FILED APR. 2, 1906.
2 SHEETS—SHEET 1.
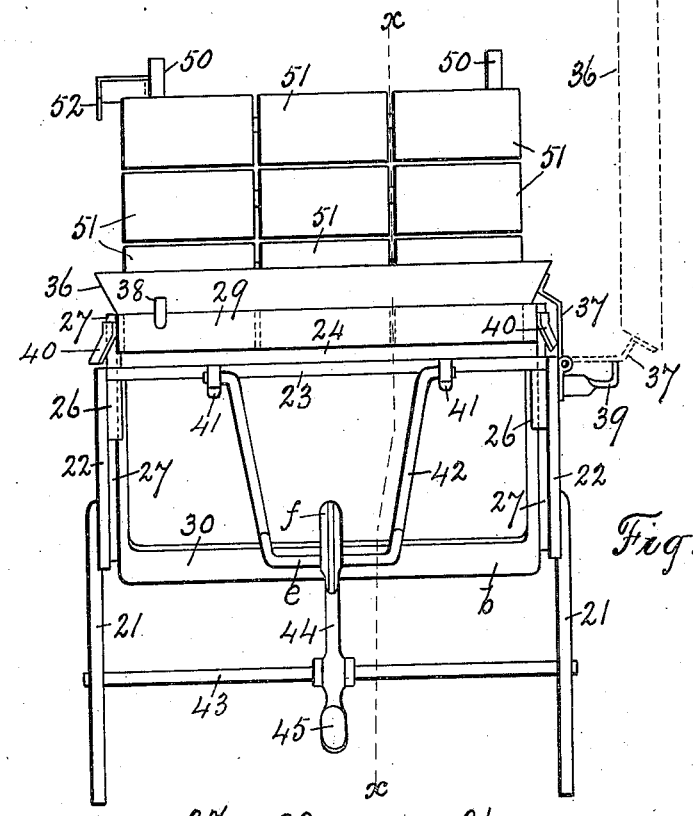
Fig. 1.
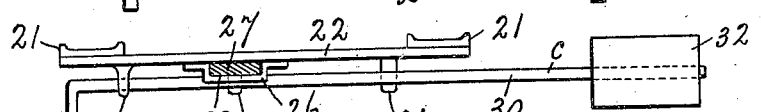
Fig. 2.
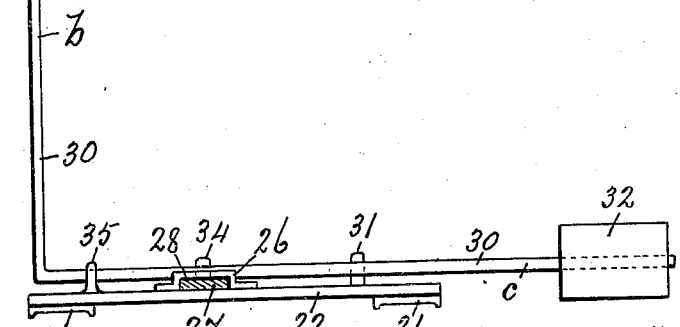
Witnesses
J. S. Edmunds
G. Petrie
Inventor
Henry Pocock
By P. J. Edmunds
Attorney No. 845,194. PATENTED FEB. 26, 1907.
H. POCOCK.
MACHINE FOR MAKING CEMENT BRICK.
APPLICATION FILED APR. 2, 1906.

2 SHEETS—SHEET 2.

Witnesses
J. S. Edmunds
G. Petrie

Inventor
Henry Pocock
By P. J. Edmunds
Attorney

UNITED STATES PATENT OFFICE.

HENRY POCOCK, OF LONDON, ONTARIO, CANADA.

MACHINE FOR MAKING CEMENT BRICK.

No. 845,194.      Specification of Letters Patent.      Patented Feb. 26, 1907.

Application filed April 2, 1906. Serial No. 309,370.

*To all whom it may concern:*

Be it known that I, HENRY POCOCK, a subject of the King of Great Britain, and a resident of the city of London, in the county of Middlesex, in the Province of Ontario, Canada, have invented a new and useful Machine for Making Cement Brick, of which the following is a specification.

This invention relates to a machine for molding cement brick, the object being to provide a machine that will readily and easily mold any number of perfect bricks, preferably nine, at one time; and it consists of the improved construction and novel combination of parts of the same, as will be hereinafter first fully set forth and described and then pointed out in the claims, reference being had to the accompanying drawings, forming part of this specification, wherein—

Figure 3:
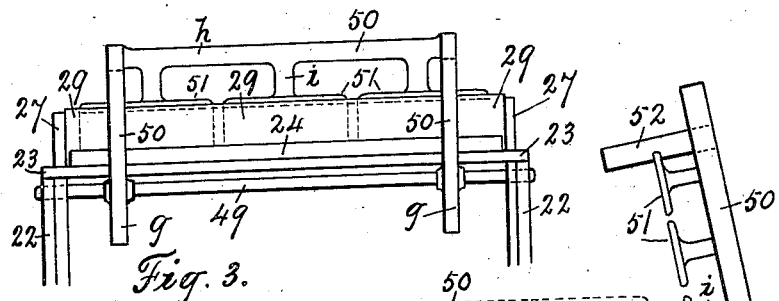
Figure 4:
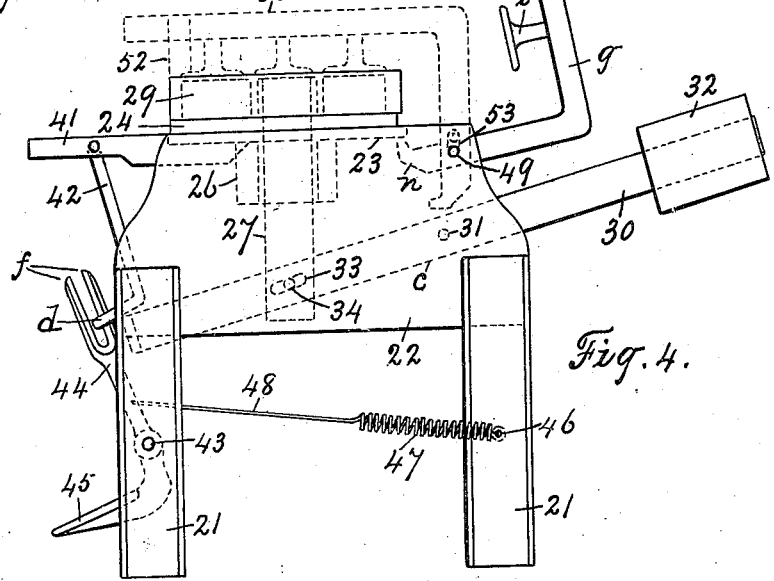
Figure 5:
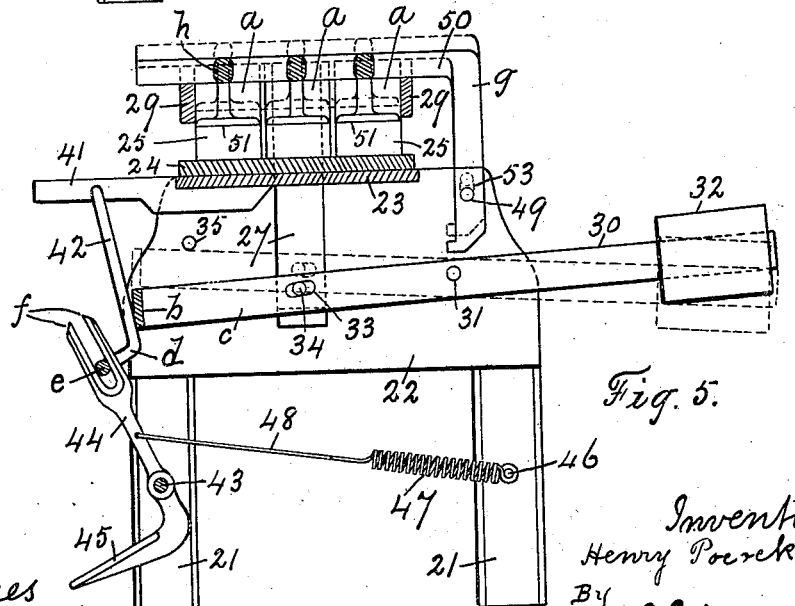

Figure 1 is a front view of a cement-brick machine embodying my invention. Fig. 2 is a plan view of the frame of the machine and the U-shaped lever. In this view the mechanism above said U-shaped lever is removed. Fig. 3 is a detail rear view of the upper portion of the machine. Fig. 4 is an end view of the machine shown in Fig. 1, except that the hopper is removed. Fig. 5 is a sectional view of the machine on the line $x$ $x$ of Fig. 1, except that in this view the molds are raised from the molded brick.

In the accompanying drawings the numeral 21 designates the legs of the machine, 22 the frame, and 23 the table, which is supported by said legs and frame at a height above the ground or floor that will be most convenient for the operator when filling and tamping the mold.

24 designates a pallet on which the cement brick 25 are molded and carried away from the machine.

26 designate guides secured opposite one another to the adjacent faces of the opposite ends of the frame 22.

27 designate vertically-reciprocating sliding bars, one of which is located at each of the two opposite ends of the machine, and said sliding bars 27 are fitted to and inserted in the sockets 28, formed in the guides 26, which construction holds said sliding bars 27 in line as they are vertically reciprocated.

29 designates the mold, and any number of compartments $a$ may be formed in this mold, according to the number of brick required to be made at one operation, and this mold 29 is rigidly secured to the upper ends of the vertically-reciprocating sliding bars 27.

30 designates a U-shaped lever, the saddle $b$ of which extends across the front of the machine, and the arms $c$ of this U-shaped lever extend toward the rear of the machine adjacent to the ends of the frame. 31 designate pivot-studs with which the adjacent faces of the ends of the frame 22 are provided, and said U-shaped lever 30 is pivotally supported by and held in place on said pivot-studs 31.

32 designate weights, one of which is supported by and adjustable on each of the arms $c$ of the U-shaped lever 30.

33 designate elongated slots formed opposite one another in the arms $c$ of the U-shaped lever 30, and 34 designate studs, one of which is rigidly secured to each of the vertically-reciprocating sliding bars 27, and one of said studs 34 is fitted to, inserted in, and adapted to move lengthwise in each of the elongated slots 33, formed in said U-shaped lever 30.

35 designate stops rigidly secured to the opposite faces of the ends of the frame 22 near the front of the machine to limit the excessive movement of the front end of the U-shaped lever 30.

36 designates a hopper, and 37 an arm, one end of which arm is rigidly secured to said hopper and the other end pivotally secured to one end of the frame 22, which adapts said hopper to be raised to a vertical position out of the way, as shown by dotted line, or to rest on the edges of the mold 29, as shown by solid line in Fig. 1, and 38 designate fingers which extend downward from said hopper and clasp the opposite sides of said mold 29 to prevent accidental movement of said hopper 36 when resting on the upper edges of said mold 29.

39 designates a bracket, one end of which is secured to the end of the frame 22, which bracket 39 is adapted to engage with the arm 37 to firmly and securely hold the hopper 36 in the vertical position shown by dotted line in Fig. 1.

40 designate conducting-shields which are secured to the opposite ends of the mold 29, particularly around the upper ends of the vertically-reciprocating bars 27, to prevent the surplus cement or concrete, if any, which may be scraped or struck off the top of the mold 29 after the hopper is raised from lodging and setting on the frame 22 around said reciprocating bars 27, the lodgment and setting of which around the upper ends of said bars would be very likely to interfere with their freedom of operation.

41 designate two forward extensions from the table 23, and 42 a U-shaped swinging arm or holder, the open ends of which are pivotally supported by and held in place in said extensions 41, and the lower end of this U-shaped holder is formed with a forward extension $d$ to form a wide bearing at the lower end of said holder 42.

43 designates a shaft, the opposite ends of which are supported by, held in place, and revolve perfectly free in bearings in the opposite front legs 21 of the machine. 44 designates a foot-lever mounted on said shaft 43, provided at its lower end with a foot-tread 45 and at its upper end with prongs $f$, and the saddle $e$ of the forwardly-extending portion $d$ of the U-shaped holder 42 is fitted to and inserted in between the prongs $f$ on the upper end of said foot-lever 44.

46 designates a rod secured to the rear legs 21 of the machine, and 47 a coil-spring secured at one end to said rod 46 and its other end connected to the upper portion of the foot-lever 44 by a connecting-rod 48. This construction normally holds the U-shaped holder 42 against the front end of the U-shaped lever 30.

49 designates a shaft supported at the rear of and in the vertically-elongated bearings 53, formed in the opposite ends of the frame 22 of the machine. 50 designates a rock-frame mounted on said shaft 49 and composed of the angular sections $g$, each provided with a foot $n$, of the sections $h$, which connect said angular sections $g$ together, and of plate-supporting extensions $i$, to each of which a top plate 51 is secured, there being as many top plates 51 as there are compartments $a$ in the mold 29.

52 designates a support secured to the free end of the rock-frame 50 to support it in proper position when the top plates 51 are adjusted over the compartments $a$ containing the newly-molded cement bricks, and the angular sections $g$, the connecting-sections $h$, and the plate-supporting extensions $i$ may be formed integral or separate and then secured to one another, as preferred.

The operation is as follows: First raise the hopper 36 to the position shown by dotted line in Fig. 1 and the rock-arm 50 to the position shown by solid line in Fig. 4. Then raise the U-shaped lever 30 to the position shown by solid line in Fig. 5. This raises the reciprocating bars 27 and the mold 29 a short distance above the table 23. Then place the pallet 24 on said table below said mold 29. Then lower the U-shaped lever 30 to the position shown in Fig. 4, which brings the mold 29 firmly and tightly down on the pallet 24 on the table 23, also as shown in Fig. 4. When in this position, the normal action of the spring 47 is to adjust the lower saddle end $e$ of the pivotal U-shaped holder 42 over on the saddle end $b$ of the U-shaped lever 30, also as shown in Fig. 4. This securely holds the mold 29 on the pallet 24 while filling, tamping, and striking off the mold and also prevents the weights 32 from operating the U-shaped lever 30 if anything should jar or strike against the machine, lever 30, or weights 32. Then adjust hopper 36 to the position shown by solid line in Fig. 1. Then fill and tamp the mold 29. Then raise hopper 36 to the position shown by dotted line in Fig. 1 and strike off the mold. Then adjust the rock-arm 50 to the position shown by dotted line in Fig. 4. This brings the top plates 51 down in the mold 29, which further tamps the bricks 25 in the compartments $a$ of said mold 29. Then press foot on the tread 45 of the foot-lever 44. This adjusts said lower end of said lever 44 inward and the upper end of said lever 44 outward from the frame of the machine, and the saddle $e$ of the U-shaped holder 42 engaging with the upper end of said lever 44 said holder 42 is adjusted outward and disengaged from the U-shaped lever 30, leaving the latter free to be raised. When adjusted as described, grasp the saddle portion $b$ of the U-shaped lever 30 and raise its front end, as well as the sliding bars 27 and mold 29, secured thereto, to the position shown by solid line in Fig. 5. This adjusts the mold 29 above and clear of the newly-molded bricks 25, when by adjusting said U-shaped lever 30 to the position shown by dotted line in Fig. 5 the mold 29 is further raised until it comes in contact with and raises the rock-frame 50 and top plates 51, secured thereto, until they are adjusted to the position shown by dotted line in Fig. 5, which adjusts the top plates 51 also clear above and free from the newly-molded bricks 25. The adjustment of said U-shaped lever 30 is assisted or facilitated by the counterbalance-weights 30. This adjustment of said rock-frame 50 and top plates 51 from the position shown by solid line to the position shown by dotted line in Fig. 5 is permitted by forming the bearing 53 in the ends of the frame 22 in which the shaft 49 is supported elongated vertically, as shown in Figs. 4 and 5. When adjusted as described, the pallet 24, on which the newly-molded bricks 25 are held, is carried from the machine, another pallet-board is placed under the mold 29, and the operation hereinbefore described is repeated, and so on until the number of bricks required are made. Of course when the mold 29 is lowered the rock-frame 50 has to be thrown back to the position shown by solid line in Fig. 4 before the hopper 36 can be lowered on the mold 29, and this rock-frame 50 is held in the convenient position shown in Fig. 4 by the feet $n$ of the angular sections $g$ engaging with the table 23.

While in the drawings forming part of this specification there is illustrated one form of construction embodying this invention which is preferred, it is understood that the elements therein shown may be varied or changed as to shape, proportion, and exact manner of assemblage without departing from the spirit of this invention.

Having thus described my invention, I claim—

1. In a device of the class described a supporting-frame including a table adapted to support a pallet, a mold movable vertically above said table and provided with spaced side bars, a weighted lever pivoted intermediate its ends to said supporting-frame, a foot-lever swinging from said supporting-frame, and a link device swinging at one end from said supporting-frame and movably coupled to said foot-lever and provided with an intermediate offset for bearing over the free end of said weighted lever to maintain the molds in depressed position.

2. In a device of the class described a supporting-frame including a table to support a pallet, a frame swinging from said supporting-frame and carrying a tamping device, a hopper swinging from said supporting-frame, a mold disposed above said table and provided with depending bars, a weighted lever swinging from said supporting-frame and connected to said bars, a foot-lever swinging from said supporting-frame, and a link swinging at one end from said frame with an intermediate offset for bearing over the free end of said weighted lever to maintain the molds in depressed position.

In testimony whereof I have signed in the presence of the two undersigned witnesses.

HENRY POCOCK.

Witnesses:
P. J. EDMUNDS,
V. COUSINS.